(12) United States Patent
Perez-Feliciano et al.

(10) Patent No.: US 11,036,386 B2
(45) Date of Patent: Jun. 15, 2021

(54) APPLICATION SWITCHING ON MOBILE DEVICES

(71) Applicant: LENOVO (Singapore) PTE, LTD., New Tech Park (SG)

(72) Inventors: David Perez-Feliciano, Morrisville, NC (US); Catherine Pratt Davis, Raleigh, NC (US); James Alan Pfaltzgraff, Raleigh, NC (US); Justin Michael Ringuette, Morrisville, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 418 days.

(21) Appl. No.: 14/590,743

(22) Filed: Jan. 6, 2015

(65) Prior Publication Data
US 2016/0196054 A1 Jul. 7, 2016

(51) Int. Cl.
*G06F 3/0488* (2013.01)
*G06F 9/451* (2018.01)
*G06F 3/0481* (2013.01)

(52) U.S. Cl.
CPC ........ *G06F 3/04883* (2013.01); *G06F 3/0481* (2013.01); *G06F 9/451* (2018.02)

(58) Field of Classification Search
CPC .. G06F 3/0483; G06F 3/0488; G06F 3/04883; G06F 3/0481; G06F 9/451
See application file for complete search history.

(56) References Cited

U.S. PATENT DOCUMENTS

| 9,547,525 | B1* | 1/2017 | Trainor | G06F 3/017 |
| 2005/0022138 | A1* | 1/2005 | Tunney | G06F 3/0482 |
| | | | | 715/827 |
| 2007/0101298 | A1* | 5/2007 | Yolleck | G06F 16/95 |
| | | | | 715/850 |
| 2008/0109753 | A1* | 5/2008 | Karstens | G06F 9/542 |
| | | | | 715/802 |
| 2010/0095240 | A1* | 4/2010 | Shiplacoff | G06F 3/0483 |
| | | | | 715/784 |
| 2010/0229100 | A1* | 9/2010 | Miller | G06F 9/485 |
| | | | | 715/745 |
| 2011/0021250 | A1* | 1/2011 | Ickman | H04L 69/04 |
| | | | | 455/566 |
| 2013/0254705 | A1* | 9/2013 | Mooring | G06F 3/0488 |
| | | | | 715/784 |
| 2014/0013271 | A1* | 1/2014 | Moore | G06F 3/0482 |
| | | | | 715/792 |

(Continued)

*Primary Examiner* — Daniel W Parcher
(74) *Attorney, Agent, or Firm* — Kunzler Bean & Adamson

(57) ABSTRACT

For application switching, a system, apparatus, method, and computer program product are disclosed. The apparatus, in one embodiment, includes a display, an input module that monitors user input for a switching command, an axis module that determines whether the switching command is along a first axis or along a second axis, the first axis being orthogonal to the second axis, and a switching module that presents a next application on the display in response to the switching command being along the first axis and that presents a next instance of a current application on the display in response to the switching command being along the second axis. In certain embodiments, the first axis comprises a vertical axis with respect to the display and the second axis comprises a horizontal axis with respect to the display.

20 Claims, 7 Drawing Sheets

(56) References Cited

U.S. PATENT DOCUMENTS

| | | | | |
|---|---|---|---|---|
| 2014/0068494 | A1* | 3/2014 | Petersen | H04M 1/7253 715/778 |
| 2014/0068518 | A1* | 3/2014 | Liu | G06F 9/4443 715/835 |
| 2014/0075374 | A1* | 3/2014 | Jitkoff | G06F 3/0483 715/784 |
| 2014/0292649 | A1* | 10/2014 | Bae | G06F 3/01 345/156 |

* cited by examiner

APPLICATION SWITCHING ON MOBILE DEVICES

FIELD

The subject matter disclosed herein relates to application switching and more particularly relates to switching between different applications or different instances of a current application on a mobile device responsive to an axis of a switching command.

BACKGROUND

Description of the Related Art

Application switching is a useful feature of operating systems allowing a user to easily switch between different applications. However, application switching is more complex on mobile devices due to a much smaller visual space and simpler user interface on a mobile device. For example, as applications on mobile devices tend to take up the entire screen, there is no easy way to indicate to the user that multiple applications are running. Further, there is no simple way to control multiple applications in the mobile operating system environment. While some mobile operating systems have an application gallery or menu that becomes available at the touch of a button, thumbnail representations of active applications that can be difficult to distinguish on the smaller screens of mobile devices.

BRIEF SUMMARY

An apparatus for application switching is disclosed. A method and computer program product also perform the functions of the apparatus. The computer program product, in one embodiment, includes a computer readable storage medium that stores code executable by a processor.

The apparatus, in one embodiment, includes a display, an input module that monitors user input for a switching command, an axis module that determines whether the switching command is along a first axis or along a second axis, the first axis being orthogonal to the second axis, and a switching module that presents a next application on the display in response to the switching command being along the first axis and that presents a next instance of a current application on the display in response to the switching command being along the second axis.

In certain embodiments, the display is a touchscreen that receives touch data corresponding to the user input, wherein the input module further comprises a gesture module that identifies a switching command based on the touch data. In certain embodiments, the first axis comprises a vertical axis with respect to the display and the second axis comprises a horizontal axis with respect to the display.

In some embodiments, the apparatus also includes a direction module that identifies a direction of the switching command, wherein the switching module selects the next application or the next instance based on the identified direction. In some embodiments, the apparatus also includes an orientation module that detects changes to the orientation of the display, wherein the orientation module adjusts orientations of the first axis and the second axis in response to a change in orientation of the display.

In some embodiments, the apparatus also includes a mapping module that identifies a plurality of active applications and generates a mapping structure linking each active application to one or more other active applications.

In certain embodiments, the mapping module identifies a plurality of open instances for an active application and links each open instance to one or more other open instances for the active application. In some embodiments, the apparatus also includes an application module that inserts a newly opened application into the mapping structure.

In some embodiments, the apparatus also includes an instance module that points to a top instance for each open application, wherein the switching module presents the top instance of the next application in response to the switching command being along the first axis. In certain embodiments, the instance module points to a new instance in response to the switching module presenting a next instance on the display.

The method, in one embodiment, includes detecting, by use of a processor, a switching command, determining whether the switching command is along a first axis or along a second axis perpendicular to the first axis, and switching from a current application to a next application in response to the switching command being along the first axis and switching from a current instance of the current application to a next instance of the current application in response to the switching command being along the second axis.

In some embodiments, the method also includes identifying a direction of the switching command, and selecting the next application or the next instance based on the identified direction. In some embodiments, the method also includes detecting a change to the orientation of the display, and adjusting orientations of the first axis and the second axis in response to detecting the change in the orientation of the display.

In some embodiments, the method also includes identifying a plurality of open applications, each open application comprising one or more instances, linking each open application to one or more other open applications, and linking each instances within an open application. In some embodiments, the method also includes detecting whether a user opens a new application, and linking the new application to one or more other open applications responsive to the user opening the new application.

In some embodiments, the method also includes detecting whether a user closes an application, identifying one or more applications linked to the closed application, removing links to the closed application, and linking the identified one or more applications to other open applications responsive to the user closing the application. In some embodiments, the method also includes storing a pointer for each of a plurality of open applications, each pointer indicating a top instance for an application, wherein switching from a current application to a next application comprises switching to the top instance of the next application.

The computer program product, in one embodiment, includes a computer readable storage medium that stores code executable by a processor, the executable code comprising code to perform—monitoring user input for a switching instruction, identifying an axis along associated with the switching instruction, displaying a next application in response to the switching instruction being associated with a first axis, and displaying a next instance of a current application in response to the switching instruction being along a second axis, the second axis being at right angles to the first axis.

In some embodiments, the program product also includes code to perform identifying a direction of the switching instruction and selecting the next application or the next instance based on the identified direction. In some embodiments, the program product also includes code to perform storing a pointer for each of a plurality of open applications, each pointer indicating a top instance for an application, wherein switching from a current application to a next application comprises switching to the top instance of the next application.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
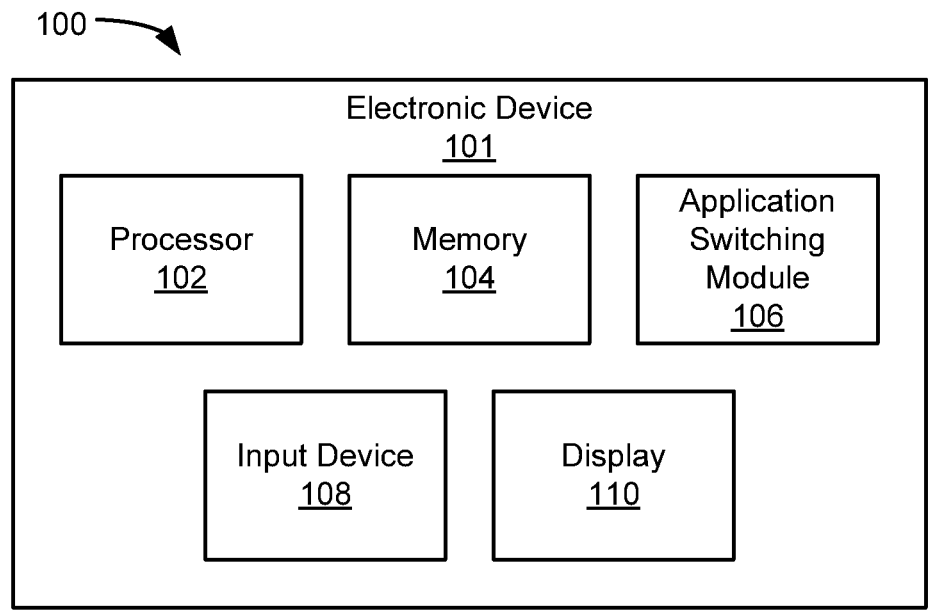
FIG. 1 is a schematic block diagram illustrating one embodiment of a system for application switching.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java®, Smalltalk®, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products switch to a next application in response to a switching command being along a first axis and switch to a next instance of a current application in response to the switching command being along a second axis. Users expect mobile devices to be simpler, easier, and idiot-proof and expect a different user interface than those used on desktop computers. The disclosed systems, apparatuses, methods, and computer program products provide a user interface of sliding windows to access all active applications and application instances in full screen. In some embodiments, the interface is such that different active applications are arranged horizontally and different instances/windows of the same application are arranged vertically (or vice versa).

FIG. 1 depicts a system 100 for application switching, according to embodiments of the disclosure. The system 100 includes an electronic device 101 containing a processor 102, a memory 104, an application switching module 106, an input device 108, and a display 110. In some embodiments, the input device 108 and the display 110 are combined into a single device, such as a touchscreen.

The processor 102, in one embodiment, may comprise any known controller capable of executing computer-readable instructions and/or capable of performing logical operations. For example, the processor 102 may be a microcontroller, a microprocessor, a central processing unit (CPU), a graphics processing unit (GPU), an auxiliary processing unit, a field programmable gate array (FPGA), or similar programmable controller. In some embodiments, the processor 102 executes instructions stored in the memory 104 to perform the methods and routines described herein. The processor 102 is communicatively coupled to the memory 104, the application switching module 106, input device 108, and the display 110.

The memory 104, in one embodiment, is a computer readable storage medium. In some embodiments, the memory 104 includes volatile computer storage media. For example, the memory 104 may include a random access memory (RAM), including dynamic RAM (DRAM), synchronous dynamic RAM (SDRAM), and/or static RAM (SRAM). In some embodiments, the memory 104 includes non-volatile computer storage media. For example, the memory 104 may include a hard disk drive, a flash memory, or any other suitable non-volatile computer storage device. In some embodiments, the memory 104 includes both volatile and non-volatile computer storage media.

In some embodiments, the memory 104 stores data relating to application switching. For example, the memory 104 may store lists of active applications, relationships between active applications, and the like. In some embodiments, the memory 104 also stores program code and related data, such as an operating system or other controller algorithms operating on the electronic device 101.

The application switching module 106, in one embodiment, is configured to monitor user input for a switching command and determine whether the switching command is along a first axis or along a second axis, the first axis being orthogonal to the second axis. The application switching module 106 will then present a next application on the display in response to the switching command being along the first axis and present a next instance of a current application on the display in response to the switching command being along the second axis. In certain embodiments, the first axis comprises a vertical axis with respect to the display and the second axis comprises a horizontal axis with respect to the display.

The application switching module 106 may be comprised of computer hardware, computer software, or a combination of both computer hardware and computer software. For example, the application switching module 106 may comprise circuitry, or a processor, configured to monitor user input. As another example, the application switching module 106 may comprise computer program code that presents a next application or a next instance of a current application based on the axis of the switching command. The application switching module 106 is discussed in further detail with reference to FIG. 2, below.

The input device 108, in one embodiment, may comprise any known computer input device including a touch panel, a button, a keyboard, or the like. For example, the input device 108 may include a handwriting input unit operatively coupled to the processor 102. In some embodiments, the input device 108 may be integrated with the display 110, for example, as a touchscreen or similar touch-sensitive display. In some embodiments, the input device 108 comprises a touchscreen such that text may be input by using a virtual keyboard displayed on the touchscreen and/or by handwriting on the touchscreen. In some embodiments, the input device 108 comprises two or more different devices, such as a keyboard and a touch panel.

The display 110, in one embodiment, may comprise any known electronically controllable display. The display 110 is configured to output visual, audible, and/or haptic signals. In some embodiments, the display 110 includes an electronic display capable of outputting visual data to a user. For example, the display 110 may include, but is not limited to, an LCD display, an LED display, an OLED display, a projector, or similar display device capable of outputting images, text, or the like to a user. As another, non-limiting, example, the display 110 may include a wearable display such as a smart watch, smart glasses, a heads-up display, or the like. Further, the display 110 may be a component of a smart phone, a personal digital assistant, a television, a table computer, a notebook (laptop) computer, a personal computer, or the like.

In certain embodiments, the display 110 includes one or more speakers for producing sound. For example, the display 110 may produce an audible alert or notification (e.g., a beep or chime) upon switching applications and/or instances. In a further example, the display 110 may produce a first audible notification when switching between different applications and a second audible notification when switching between different instances. In some embodiments, the display 110 includes one or more haptic devices for producing vibrations, motion, or other haptic feedback. For example, the display 110 may produce haptic feedback when switching between different applications and/or instances.

In some embodiments, all or portions of the display 110 may be integrated with the input device 108. For example, the input device 108 and display 110 may form a touchscreen or similar touch-sensitive display. In other embodiments, the display 110 may be located near the input device 108. In certain embodiments, the display 110 may receive instructions and/or data for output from the processor 102 and/or the application switching module 106.

Figure 2:
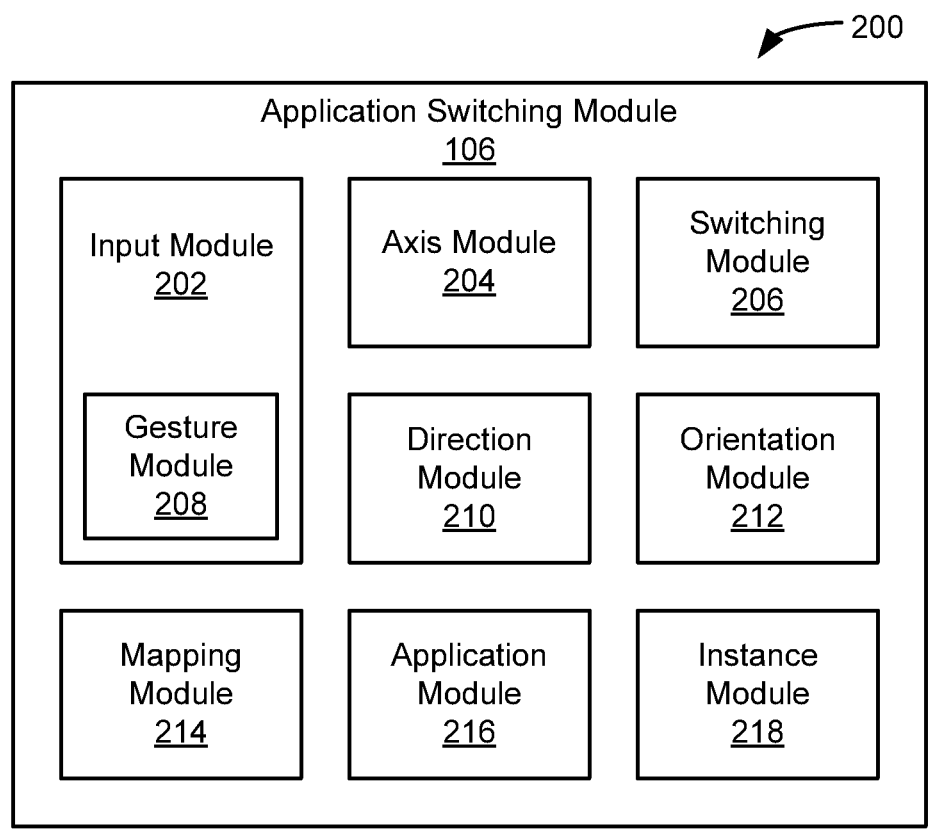
FIG. 2 is a schematic block diagram illustrating one embodiment of an apparatus for application switching.

FIG. 2 depicts an apparatus 200 for application switching, according to embodiments of the disclosure. The apparatus 200 includes an application switching module 106, which may be substantially similar to the application switching module 106 described above with respect to FIG. 1. In general, the apparatus 200 detects a switching command, determines whether the switching command is along a first axis or along a second axis perpendicular to the first axis, switches from a current application to a next application in response to the switching command being along the first axis, and switches from a current instance of the current application to a next instance of the current application in response to the switching command being along the second axis.

The application switching module 106, in one embodiment, includes an input 202, an axis module 204, and a switching module 206. In some embodiments, the application switching module 106 also includes one or more of a gesture module 208, a direction module 210, an orientation module 212, a mapping module 214, an application module 216, and/or an instance module 218. The modules of the application switching module 106 may be communicatively coupled to one another.

The input module 202, in one embodiment, is configured to monitors user input for a switching command. In some embodiments, the switching command may be a mouse movement, a keyboard command, a gesture, or the like. For example, where the display 110 is a touchscreen, the input module 202 may monitor for a touch input switching command. In some embodiments, the input module 202 receives inputs directly from the input device 108. In other embodiments, the input module 202 receives user inputs via an operating system running on the electronic device 101.

In some embodiments, the input module 202 only monitors user input of a certain type. For example, the input module 202 may monitor touch inputs from a touchscreen display and ignore key presses or voice input. In other embodiments, the gesture module 208 monitors a plurality of input types. For example, the switching commands may be a mouse input in conjunction with a key press, wherein input module 202 monitors both key input and mouse input for the switching command. In response to identifying the switching gesture, the input module 202 sends a switching command indication to the axis module 204 (and optionally the direction module 210) wherein an axis (and optionally a direction) of the switching command is determined from the switching gesture.

The axis module 204, in one embodiment, is configured to determine whether the switching command is along a first axis or along a second axis, the first axis being orthogonal to the second axis. In some embodiments, the axis module 204 receives data relating to the switching command from the input module 202, wherein the axis module 204 identifying an axis associated with the switching command based on the received data. In further embodiments, the axis module 204 may also identify a direction of the switching instruction. In response to determining whether the switching command is along a first axis or along a second axis, the axis module 204 indicates the determined axis to the switching module 206, wherein the switching module 206 switches the current application or the current instance based on the determined axis.

In some embodiments, the first and second axis are based on the orientation of the display 110. For example, where the display 110 is rectangular, the first axis may be parallel with the longer sides of the display 110 while the second axis may be parallel with the shorter sides of the display 110. In certain embodiments, the first axis corresponds to a vertical axis and the second axis corresponds to a horizontal axis, wherein the orientations of the first and second axis change with respect to the display 110 as the user rotates the display 110. In one embodiment, the axis module 204 detects a change to the orientation of the electronic device 101 and maintains the orientations of the first axis and the second axis with respect to the user. For example, the first axis may remain horizontal with respect to the user even as the user rotates the electronic device 101 from a landscape orientation to a portrait orientation or vice versa.

The switching module 206, in one embodiment, is configured to present a next application on the display in response to the switching command being along the first axis and present a next instance of a current application on the display in response to the switching command being along the second axis. In some embodiments, the switching module 206 receives an indication of whether the switching command is along a first axis or along a second axis from the axis module 204, wherein the switching module 206 presents the next application or instance based on the received indication. In further embodiments, the switching module 206 receives an indication of a direction of the switching command and selects the next application or the next instance based on the identified direction.

In some embodiments, the switching module 206 selects a next application or the next instance based on a mapping structure that describes the arrangement of the active applications and their instances. For example, the mapping structure may be used to determine a next application based on a current application and a direction of the switching command. As another example, the mapping structure may be used to determine a next instance of a current application based on a current instance and a direction of the switching command. In further embodiments, the mapping structure may include a plurality of pointers indicating a current application, a current instance, a top instance for each active application, one or more next applications, and/or one or more next instances. For example, the switching module 206 may refer to the pointers to present a top instance of the next application in response to the switching command being along the first axis.

In a further embodiment, the switching module 206 monitors for a change in orientation of the display 110. In response to a change in display orientation, the switching module 206 modifies its behavior to switch between different applications in response to a switching command along the second axis and to switch between different instances in response to a switching commands along the first axis. The switching module 206 may revert to its initial behavior in response to the display reverting to its initial orientation.

In one embodiment, the switching module 206 may be used to navigate a file system. The switching module 206 may group items of a file directory by type (e.g., photo, document, audio file, video file, sub-directory), wherein the switching module 206 switches between different groups in response to a switching command on the first axis and switches between different items within a group in response to a switching command on the second axis. For example, a file directory containing files downloaded by the user may include multiple files of varying file type. In response to a switching command on the horizontal axis, the switching module 206 may switch between the different file types. Further, the switching module 206 may scroll between the different file within a file type in response to a switching command on the horizontal axis.

The gesture module 208, in one embodiment, is configured to identify a switching command based on touch data corresponding to the user input. In some embodiments, the touch data is received from a touchscreen display or a touch sensitive panel. The gesture module 208 monitors the user input for a switching gesture corresponding to the switching command. For example, the gesture module 208 may monitor touch data for a predetermined pattern of touch inputs, such as a swipe. In some embodiments, the switching gesture may be a multi-touch gesture.

In some embodiments, the gesture module 208 identifies the switching gesture based on touch inputs from a particular area of the touchscreen display (such as an edge of the display). In certain embodiments, the gesture module 208 identifies the switching gesture based on the length and/or speed of the gesture. In response to identifying the switching gesture, the gesture module 208 sends a switching command indication to the axis module 204 (and optionally the direction module 210) wherein an axis (and optionally a direction) of the switching command is determined from the switching gesture.

As depicted in the embodiment of FIG. 2, the gesture module 208 may be a component of the input module 202 in communication with the input module 202, the axis module 204, and/or the direction module 210. In another embodiment, the orientation module 212 may be a separate and independent module, in communication with the input module 202, the axis module 204, and the direction module 210.

The direction module 210, in one embodiment, is configured to identify a direction of the switching command. In some embodiments, the switching direction is based on the axis identified by the axis module 204. For example, if the switching command is along a "left-right" axis, the direction module 210 may identify whether the switching command is in a rightward direction or a leftward direction. As another example, if the switching commands is along an "up-down" axis, the direction module 210 may identify whether the switching command is in an upward direction or a downward direction.

The direction module 210 is further configured to indicate the identified direction to the switching module 206, wherein the switching module 206 selects the next application or the next instance based on the identified direction. In some embodiments, the direction module 210 correlates the identified direction to a switching direction, the switching direction indicating to which application or instance the switching module 206 should switch. In certain embodiments, the switching direction relates to a mapping structure that maps the plurality of application and instances open (e.g., active) on the electronic device 101. In further embodiments, where a plurality of pointers link one application and/or instance to another in the mapping structure, the switching direction may indicate a link (e.g., a forward link or a backward link) from which the next application and/or instance is to be selected.

As an example, the direction module 210 may identify that the switching command is in a rightward direction and determine the switching direction to be a "forward" direction. The forward switching direction indicates that an application and/or instance "in front of" the current application on the mapping structure is to be selected as the next application and/or instance. Alternatively, a leftward switching command may correspond to a "backward" switching direction, indicating that the next application and/or instance will to be the application and/or instance "in back of" the current application and/or instance. In a further example, the mapping structure may include a plurality of pointers, each pointer identifying a forward link to an application or instance and a backward link to an application or instance. Accordingly, the switching direction may indicate which of the forward link or backward link is to be used when switching the application or instance.

In certain embodiments, the direction module 210 receives user input corresponding to the switching command from the input module 202 and provides output indicating the identified direction to the switching module 206. As depicted in the embodiment of FIG. 2, the direction module 210 may be a separate and independent module, in communication with the input module 202, the axis module 204, and the switching module 206. In another embodiment, the direction module 210 may be a component of the input module 202, the axis module 204, and/or the switching module 206 in communication with others of the input module 202, the axis module 204, and the switching module 206.

The orientation module 212, in one embodiment, is configured to detect changes to the orientation of the display. In some embodiments, the orientation module 212 determines the orientation of the electronic device 101 and/or display 110. In certain embodiments, the orientation module 212 includes one or more of an accelerometer, a gyrometer, and a gyroscope for determining the orientation of the display. In other embodiments, the orientation module 212 monitors output from one or more of an accelerometer, a gyrometer, and a gyroscope to determine the orientation of the display.

In response to a change in orientation of the display, the orientation module 212 adjusts the orientations of the first axis and the second axis. In one embodiment, the orientation module 212 informs the axis module 204 of the change in orientation, such that the axis module 204 determines an orientation of the switching commands with respect to the adjusted axis orientations. In some embodiments, the orientation module 212 rotates the orientation of the first and second axis with respect to their initial orientation to match a rotation of the display. In other embodiments, the orientation module 212 swaps the orientations of the first and second axis in response to a change in orientation of the display.

For example, for a rectangular display 110 the first axis may initially be aligned with a horizontal direction (e.g., left-and-right) while the second axis may be initially aligned with the vertical direction (e.g., up-and-down). If the user rotates the device 101 (e.g., changing the display orientation from a "landscape" orientation to a "portrait" orientation) the first axis would be aligned with the vertical direction while the second axis would be aligned with the horizontal direction. Accordingly, in response to the orientation module 212 detecting the change in the orientation of the display 110 (e.g., due to the user rotating the device 101), the orientation module 212 adjusts the orientations of the first axis and the second axis so that the first axis remains aligned with the horizontal direction (and the second axis with the vertical direction) despite the change in display orientation.

As depicted in the embodiment of FIG. 2, the orientation module 212 may be a separate and independent module, in communication with the input module 202, the axis module 204, and the switching module 206. In another embodiment, the orientation module 212 may be a component of the input module 202, the axis module 204, and/or the switching module 206 in communication with others of the input module 202, the axis module 204, and the switching module 206.

The mapping module 214, in one embodiment, is configured to identify a plurality of active applications on the electronic device 101 and generate a mapping structure linking each active application to one or more other active applications. In some embodiments, the mapping module 214 identifies a plurality of open instances for an active application and links each open instance to one or more other open instances for the active application. In one embodiment, the mapping module 214 identifies a plurality of open applications (each open application comprising one or more instances), links each open application to one or more other open applications, and links each instances within an open application. In another embodiment, the mapping structure maps the plurality of application and instances open (e.g., active) and defines relationships among the application used to select the next application or instance. The mapping structure may be any data structure suitable for mapping the active (e.g., open) applications and their open instances.

In some embodiments, the mapping module 214 links each application to a next application in a forwards direction (e.g., a forward link) and a next application in a backward direction (e.g., a backward link). The mapping module 214 may also mapping module 214 link each instance of an application to a next instance in a forwards direction (e.g., a forward link) and a next instance in a backward direction (e.g., a backward link). In one embodiment, the switching module 206 will select one of the forward link and the backward link in response to the direction module 210 identifying a direction of the switching command.

In some embodiments, the mapping module 214 generates a mapping structure that includes a plurality of pointers, each pointer identifying a forward link to an application or instance and a backward link to an application or instance. In certain embodiments, the mapping structure may include pointers indicating a current application and a current instance of the current application. In further embodiments, the mapping structure also includes pointers indicating one or more next applications and/or one or more next instances of the current application.

In some embodiments, the mapping module 214 detects whether a user opens a new application. In certain embodiments, the mapping module 214 receives an indication from an operating system running on the electronic device 101 in response to the user opening a new application or instance, wherein the mapping module 214 modifies the mapping structure based on the indication. For example, the mapping module 214 may receive indication from an operating system running on the electronic device 101 responsive to the user opening/closing an application or instance. In one embodiment, the mapping module 214 links the new application to one or more other open applications responsive to the user opening the new application.

In some embodiments, the mapping module 214 detects whether a user closes an application. In certain embodiments, the mapping module 214 receives an indication from an operating system running on the electronic device 101 in response to the user closing an application or instance, wherein the mapping module 214 modifies the mapping structure based on the indication. For example, the mapping module 214 may receive indication from an operating system running on the electronic device 101 responsive to the user opening/closing an application or instance. In one embodiment, the mapping module 214 identifies one or more applications linked to the closed application, removes the links to the closed application, and links the identified one or more applications to other open applications responsive to the user closing the application.

In certain applications, the mapping module 214 receives an indication from the switching module 206 in response to the user switching to a next application or instance, wherein the mapping module 214 modifies the mapping structure based on the indication.

As depicted in the embodiment of FIG. 2, the mapping module 214 may be a separate and independent module, in communication with the axis module 204, the switching module 206, and/or the direction module 210. In another embodiment, the mapping module 214 may be a component of the axis module 204, the switching module 206, and/or the direction module 210 in communication with others of the axis module 204, switching module 206, and/or the direction module 210.

The application module 216, in one embodiment, is configured to insert a newly opened application into the mapping structure defined by the mapping module 214. In certain embodiments, the application module 216 monitors a list of active applications to identify the newly opened application. For example, the application module 216 may identify a newly active application and edit the mapping structure to include the newly active application among existing applications in the mapping structure. In further embodiments, the application module 216 may remove one or more closed applications from the mapping structure in response to the user closing those applications.

In some embodiments, the newly opened application immediately becomes the currently displayed application (e.g., by the operating system) and the application module 216 adds the newly opened application to the top of mapping structure (e.g., as the top application). In some embodiments, the application module 216 edits the links of one or more already active applications to link to the newly opened application. For example, the application module 216 may link to the newly opened application whatever application was displayed immediately prior to the newly opened application becoming the currently displayed application.

In some embodiments, the application module 216 points to a top application among the plurality of active applications, the top application being the currently displayed active application. In certain embodiments, the application module 216 creates a top application pointer that indicates the currently displayed active application. The application module 216 may further indicate the top application to the switching module 206.

In some embodiments, the application module 216 calculated one or more next application pointers indicating one or more next applications for display. For example, the application module 216 may identify the top application and calculate two next application pointers based on the top application. In certain embodiments, the switching module 206, when selecting and switching to a next application responsive to a switching command along the first axis, may refer to the one or more next application pointers stored by the application module 216 indicating the one or more next applications for display. In further embodiments, the switching module 206 may select among two next application pointers based on an identified direction (e.g., rightward or leftward) of the switching command.

In some embodiments, the application module 216 monitors which active application is currently displayed (e.g., the current application) and adjusts the one or more pointers in response to the switching module 206 switching to a next application. For example, the application module 216 may detect that the switching module 206 has switched to a next application and then adjust the top application pointer and the one or more next application pointers based on the newly displayed application.

As depicted in the embodiment of FIG. 2, the application module 216 may be a separate and independent module, in communication with the switching module 206, direction module 210, and/or the mapping module 214. In another embodiment, the application module 216 may be a component of the switching module 206, direction module 210, and/or the mapping module 214 in communication with others of the switching module 206, direction module 210, and/or the mapping module 214.

The instance module 218, in one embodiment, is configured to point to a top instance for each active application. In certain embodiments, the instance module 218 creates a top instance pointer for each active application, each top pointer indicating the top instance for the corresponding active application. As used herein, the top instance is the currently displayed instance for a currently displayed application. Further, the top instance also refers to whichever instance was last displayed for an active application that is not currently displayed. Thus, each application has a top instance, the top instance being the most recently displayed instance.

In some embodiments, the instance module 218 points to one or more subsequent instances where there are a plurality of instances open for a common application. For example, the instance module 218 may identify a top instance and sort the remaining instances into a list, the list order being based on when each instance was the top instance. In a further example, the list may be a circular list such that the top instance is linked to the bottom instance. Additionally, the instance module 218 may store a pointer indicating one or more next instances for display.

In some embodiments, the instance module 218 indicates the top instance for each active application to the switching module 206. In certain embodiments, the switching module 206, when selecting and switching to a next instance responsive to a switching command, may refer to the one or more pointers stored by the instance module 218. Accordingly, when the switching module 206 presents the top instance of the next application in response to the switching command being along the first axis, the switching module 206 may refer to the top instance pointer created by the instance module 218 for the next application and present the instance indicated by the top instance pointer.

In some embodiments, the instance module 218 monitors which instance is currently displayed (e.g., the current instance) and adjusts the one or more pointers in response to the switching module 206 switching to a next instance. For example, the instance module 218 may detect that the switching module 206 has switched to a next instance and may then adjust the top instance pointer to point to the next instance, due to the "next" instance becoming the currently displayed instance.

In certain embodiments, the instance module 218 detects when the user opened a new instance for an active application. In certain embodiments, the application module 216 monitors a list of active windows and/or application instances to identify the newly opened instance. The instance module 218 may then insert a newly opened application into the mapping structure defined by the mapping module 214. For example, the instance module 218 may identify a new instance of an already opened application and edit the mapping structure to include the new instance among existing instances for that application. In further embodiments, the instance module 218 may remove one or more closed instances from the mapping structure in response to the user closing those instances.

In some embodiments, the newly opened instance immediately becomes the currently displayed instance (e.g., by the operating system) and the instance module 218 edits top instance pointer to indicate the newly opened instance. In some embodiments, the instance module 218 edits the links of one or more already opened instances to link to the newly opened instance. For example, the instance module 218 may link to the newly opened instance whatever instance was displayed immediately prior to the newly opened instance becoming the currently displayed instance.

As depicted in the embodiment of FIG. 2, the instance module 218 may be a separate and independent module, in communication with the input module 202, the axis module 204, and the switching module 206. In another embodiment, the instance module 218 may be a component of the switching module 206, direction module 210, and/or the mapping module 214 in communication with others of the switching module 206, direction module 210, and/or the mapping module 214.

FIGS. 3A-3F depict embodiments of a mobile device 300 for application switching, the mobile device 300 including a set 350 of active applications, according to embodiments of the disclosure. The mobile device 300, in one embodiment, is substantially similar to the electronic device 101 and may include an application switching module 106, and/or an apparatus 200, as described above with reference to FIGS. 1-2.

Figure 3A:
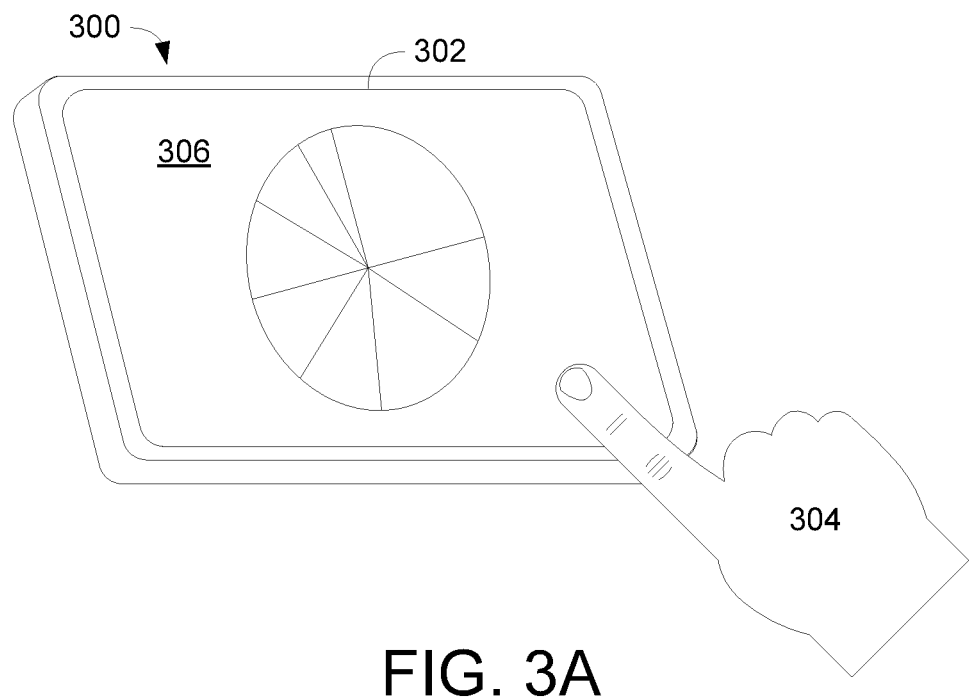
FIG. 3A is a perspective view diagram illustrating one embodiment of a mobile device for application switching.

FIG. 3A depicts a perspective view of one embodiment of the mobile device 300. As depicted, the mobile device 300 includes a touchscreen display 302 capable of both displaying image data and receiving touch input from a user 304. The touchscreen display 302 presents a top interface 306 corresponding to a top instance of a top application from the set 350 of active applications. As the user 304 interacts with the top interface 306, the mobile device 300 monitors for a switching instruction from the user 304. In some embodiments, the switching instruction is a gesture comprising a predetermined pattern of touch inputs (e.g., a swipe).

Figure 3B:
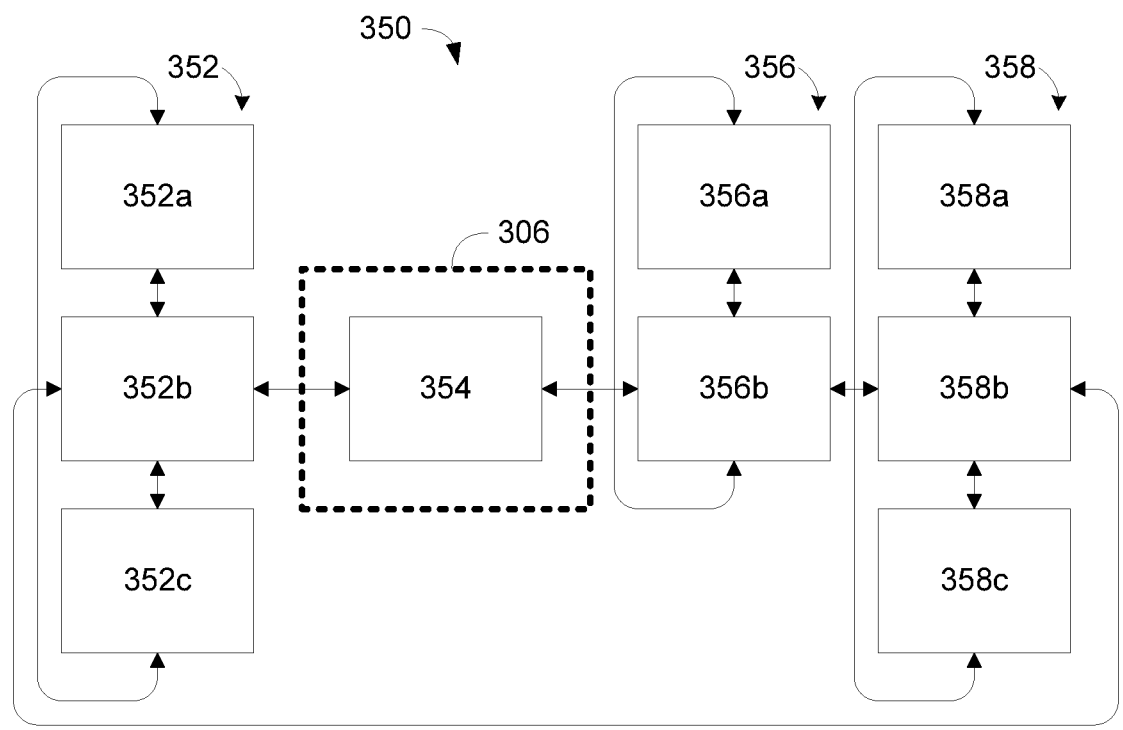
FIG. 3B is a schematic block diagram illustrating an arrangement of the active applications of the mobile device of FIG. 3A.

FIG. 3B is a schematic block diagram depicting an arrangement of the set 350 of active applications based on the state of the mobile device 300 depicted in FIG. 3A. As depicted, the set 350 of active applications includes a first application 352, a second application 354, a third application 356, and a fourth application 358. As depicted, the second application 354 (containing a single instance) corresponds to the top window 306.

In one embodiment, the first application 352 includes three instances 352a-352c, the third application 356 includes two instances 356a-356b, and the fourth application 358 includes three instances 358a-358c. While four active applications are depicted in FIG. 3B, in other embodiments the set 350 of active applications may contain more or fewer active applications simultaneously running on the mobile device 300. Further, the number of instances for each application 352-358 may be greater or lesser in other embodiments.

Each application in the set 350 of active applications is linked to two others of the set 350 of active applications. As depicted, the first program 352 is linked to the second program 354 and the fourth program 358, the second program 354 is linked to the third program 356 and the first program 352, the third program 356 is linked to the fourth program 358 and the second program 354, and the fourth program 358 is linked to the first program 352 and the third program 356. In certain embodiments, each application link is represented by a next application pointer stored with a mapping structure describing the arrangement of the set 350 of active applications. In further embodiments, each application link may correspond to either a forward link or a backward link indicating a next application.

In some embodiments, the instances for each application 352-358 are linked to one another. As depicted, the first instance 352a of the first program 352 is linked to the second instance 352b of the first program 352 and the third instance 352c of the first program 352, the second instance 352b of the first program 352 is linked to the first instance 352a of the first program 352 and the third instance 352c of the first program 352, and the third instance 352c of the first program 352 is linked to the first instance 352a of the first program 352 and the second instance 352b of the first program 352. Further, the first instance 356a of the third program 356 is linked to the second instance 356b of the third program 356, while the first instance 358a of the fourth program 358 is linked to the first instance 358a of the fourth program 358 and the third instance 358c of the fourth program 358, the second instance 358b of the fourth program 358 is linked to the first instance 358a of the fourth program 358 and the third instance 358c of the fourth program 358, and the third instance 358c of the fourth program 358 is linked to the first instance 358a of the fourth program 358 and the second instance 358b of the fourth program 358. In certain embodiments, each instance link is represented by a next instance pointer stored with a mapping structure describing the arrangement of the set 350 of active applications. In further embodiments, each instance link may correspond to either a forward link or a backward link indicating a next instance.

Figure 3C:
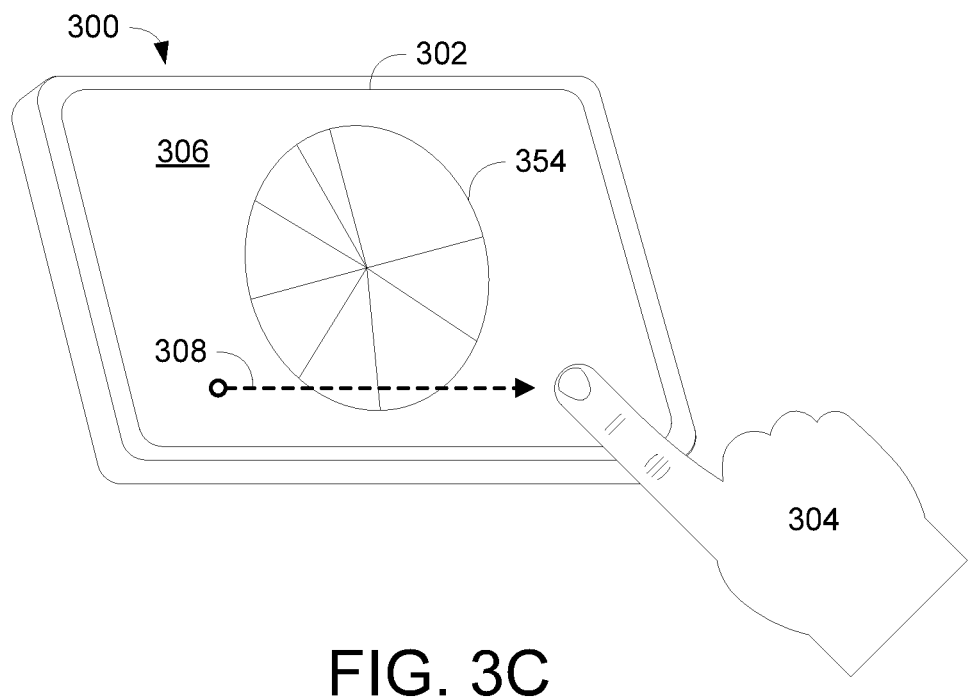
FIG. 3C is a perspective view diagram illustrating the mobile device of FIG. 3A receiving a switching instruction on a first axis.

FIG. 3C depicts a perspective view of one embodiment of the mobile device 300 receiving a first switching instruction 308 from the user 304. Upon detecting the switching instruction 308, the mobile device 300 determines an axis associated with the first switching instruction 308 and a direction of the first switching instruction 308. In the depicted embodiment, the first switching instruction 308 is received along a first axis (e.g., a horizontal axis) in a rightward direction. Based on the axis and direction of the first switching instruction 308, the mobile device 300 will display a next application on the touchscreen display 302 instead of the current application (e.g., second application 354). In certain embodiments, the mobile device 300 selects the next application based on a mapping structure storing the arrangement of the set 350 of active applications.

Figure 3D:
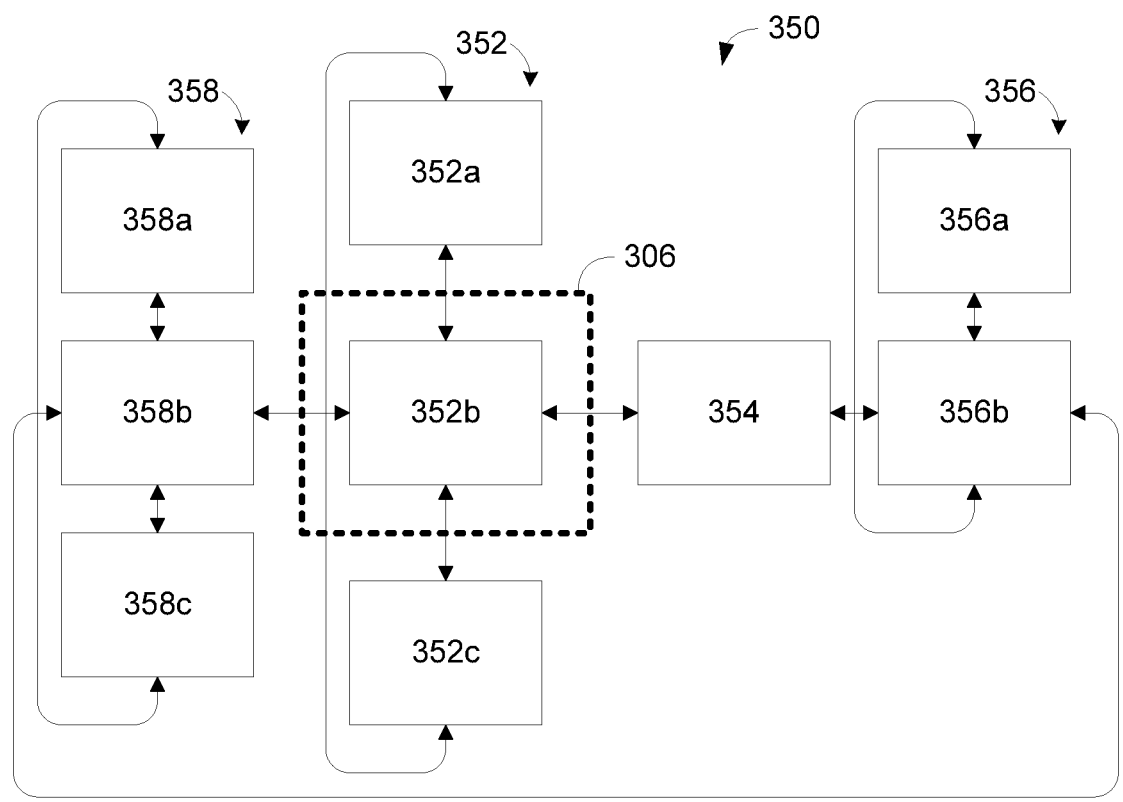
FIG. 3D is a schematic block diagram illustrating the arrangement of the active applications of the mobile device of FIG. 3A after receiving a switching instruction on a first axis.

FIG. 3D is a schematic block diagram depicting an arrangement of the set 350 of active applications after receiving a first switching instruction 308 on a first axis as depicted in FIG. 3C. Upon receiving the first switching instruction 308 on a horizontal axis and in a rightward direction, the mobile device 300 switches from the second program 354 to the second instance 352b of the first program 352. In some embodiments, the mobile device 300 examines a next application pointer for the second program 354 to identify the first program 352 as the particular application to be presented in the top interface 306. In further embodiments, the mobile device 300 may examine a top instance pointer for the first application 352 to identify the instance 352b as the particular instance of the first application 352 to be presented in the top interface 306. While a rightward switching instruction resulted in the mobile device 300 displaying the application to the left of the second program 354 in the arrangement of the set 350 of active applications (e.g., displaying the first program 352), in other embodiments a rightward switching instruction may result in the mobile device 300 displaying an application to the right of the second program 354 in the arrangement of the set 350 of active applications.

Figure 3E:
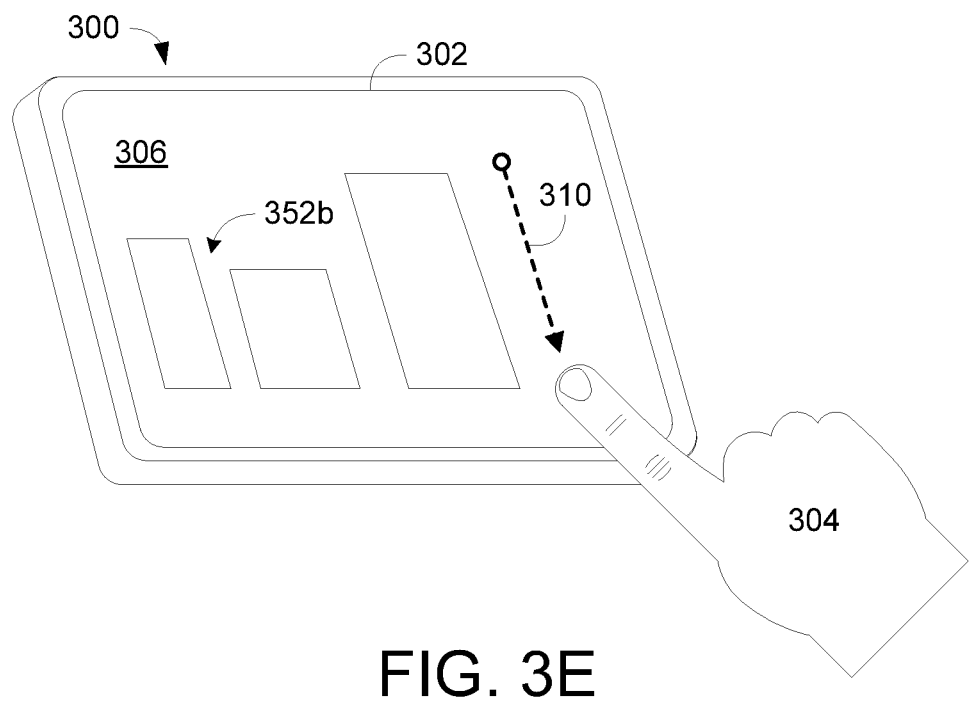
FIG. 3E is a perspective view diagram illustrating the mobile device of FIG. 3A receiving a switching instruction on a second axis.

FIG. 3E depicts a perspective view of one embodiment of the mobile device 300 receiving a second switching instruction 310 from the user 304. Upon detecting the second switching instruction 310, the mobile device 300 determines an axis associated with the second switching instruction 310 and a direction of the second switching instruction 310. In the depicted embodiment, the second switching instruction 310 is received along a second axis (e.g., a vertical axis) in a downward direction. Based on the axis and direction of the second switching instruction 310, the mobile device 300 will display a next instance on the touchscreen display 302 instead of the current instance (e.g., second instance 352b of the first program 352). In certain embodiments, the mobile device 300 selects the next instance based on a mapping structure storing the arrangement of the set 350 of active applications.

Figure 3F:
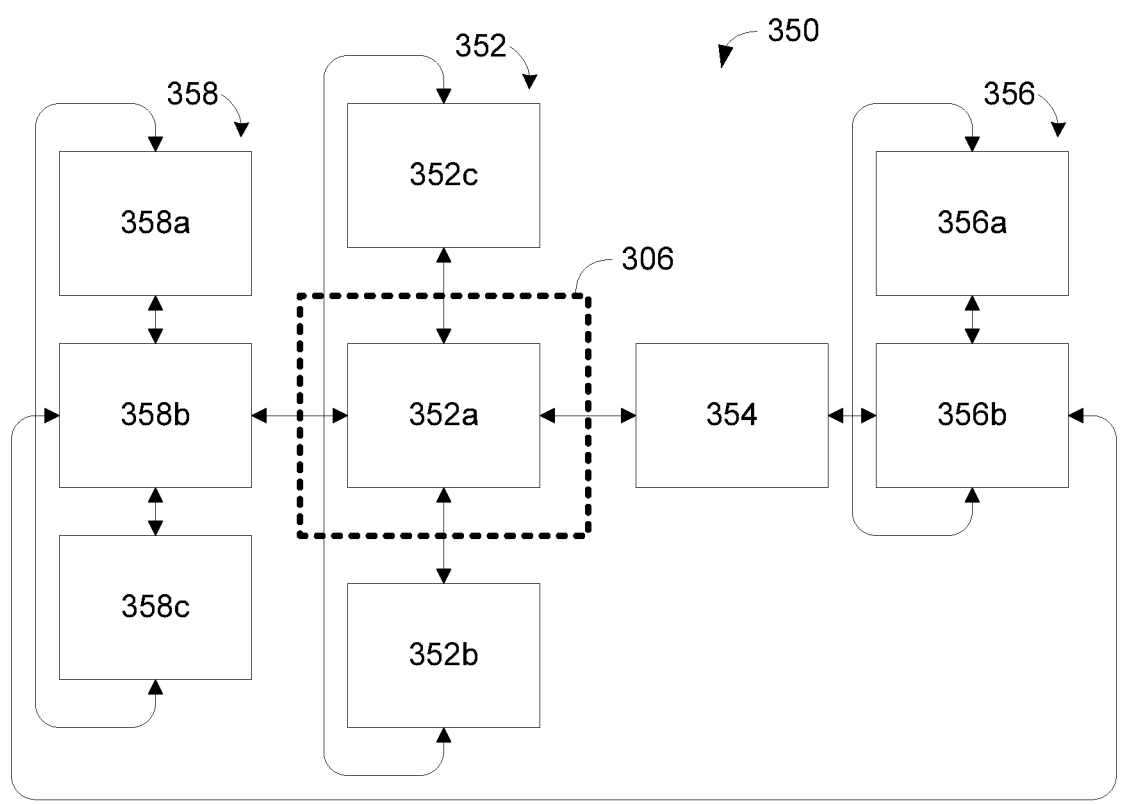
FIG. 3F is a schematic block diagram illustrating an arrangement of the active applications of the mobile device of FIG. 3A after receiving a switching instruction on a second axis.

FIG. 3F is a schematic block diagram depicting an arrangement of the set 350 of active applications after receiving a second switching instruction 310 on a second axis as depicted in FIG. 3E. Upon receiving the second switching instruction 310 on a vertical axis and in a downward direction, the mobile device 300 switches from the second instance 352b of the first program 352 to the first instance 352a of the first program 352. In some embodiments, the mobile device 300 examines a next instance pointer for the second instance 352b of the first program 352 to identify the first instance 352a of the first program 352 as the particular instance of the first program 352 to be presented in the top interface 306. While a downward switching instruction resulted in the mobile device 300 displaying the instance above of the second instance 352b of the first program 352 (e.g., the first instance 352a of the first program 352) in the arrangement of the set 350 of active applications, in other embodiments a rightward switching instruction may result in the mobile device 300 displaying an instance to below the second instance 352b of the first program 352 (e.g., the third instance 352c of the first program 352) in the arrangement of the set 350 of active applications.

Figure 4:
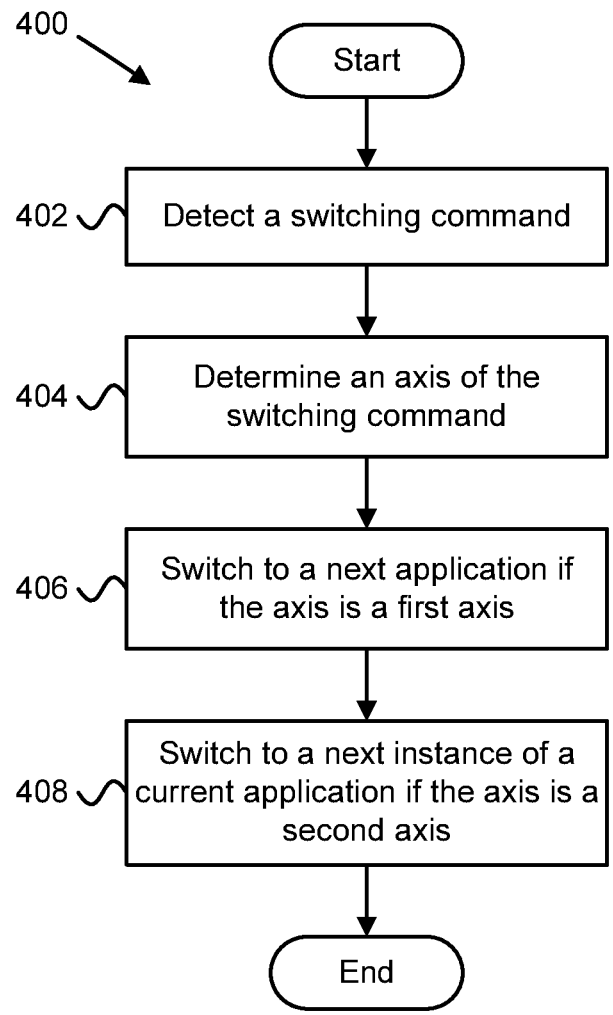
FIG. 4 is a schematic flow chart diagram illustrating one embodiment of a method for application switching.

FIG. 4 depicts a method 400 for application switching, according to embodiments of the disclosure. In some embodiments, the method 400 is performed by a mobile device, such as the electronic device 101 and/or the apparatus 200 described above with reference to FIGS. 1 and 2. In other embodiments, the method 400 may be performed by an illumination adjustment module, such as the application switching module 106 described above with reference to FIGS. 1 and 2. In certain embodiments, the method 400 may be performed by a processor executing program code, for example, a microcontroller, a microprocessor, a central processing unit (CPU), a graphics processing unit (GPU), an auxiliary processing unit, a field programmable gate array (FPGA), or the like.

The method 400 begins with detecting 402 a switching command. In some embodiments, detecting 402 the switching command includes monitoring user input for the switching command. In further embodiments, detecting 402 the switching command includes monitoring touch input for an input gesture corresponding to the switching command. The method 400 determines 404 an axis of the switching command. In some embodiments, determining 404 the switching command axis includes determining whether the switching command is along a first axis or along a second axis perpendicular to the first axis.

If the switching command is along a first axis, the method 400 switches 406 to a next application. In certain embodiments, switching 406 to the next application includes identifying a next application based on a mapping structure organizing a plurality of active applications and open instances of each active application. In further embodiments, switching 406 to the next application includes identifying a top instance of the next application. In some embodiments, switching 406 to the next application includes accessing a pointer indicating a next instance based on the current instance.

Otherwise, if the switching command is on a second axis, the method switches 408 to a next instance of a current application, and the method 400 ends. The first and second axis are sufficiently distinct to easily associate a particular axis with the switching command. In some embodiments, the first axis and second axis are perpendicular to each other. In certain embodiments, switching 408 to the next instance includes identifying a next application based on a mapping structure organizing a plurality of active instances for each active application. In further embodiments, switching 408 to the next instance includes accessing a pointer indicating a next instance based on the current instance.

Figure 5:
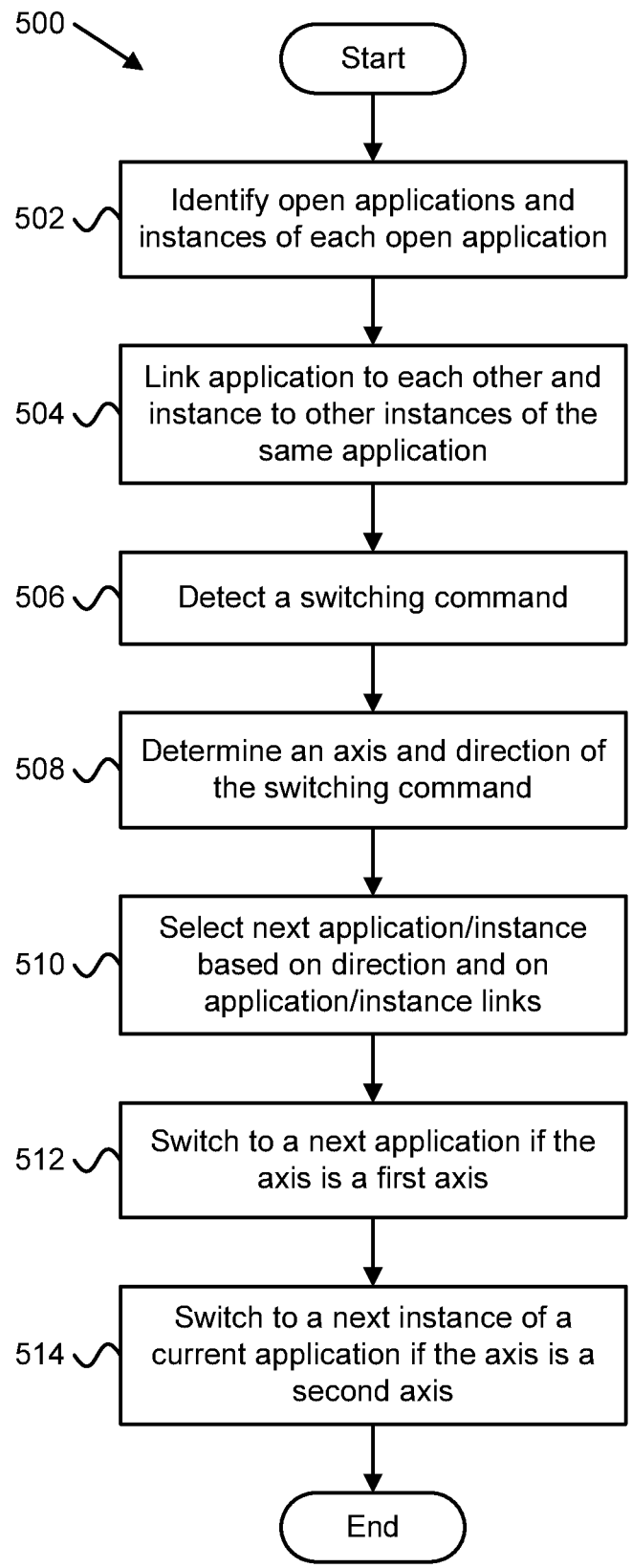
FIG. 5 is a schematic flow chart diagram illustrating another embodiment of a method for application switching.

FIG. 5 depicts a method 500 for application switching, according to embodiments of the disclosure. In some embodiments, the method 500 is performed by a mobile device, such as the electronic device 101 and/or the apparatus 200 described above with reference to FIGS. 1 and 2. In other embodiments, the method 500 may be performed by an illumination adjustment module, such as the application switching module 106 described above with reference to FIGS. 1 and 2. In certain embodiments, the method 500 may be performed by a processor executing program code, for example, a microcontroller, a microprocessor, a central processing unit (CPU), a graphics processing unit (GPU), an auxiliary processing unit, a field programmable gate array (FPGA), or the like.

The method 500 begins with identifying 502 open applications and instances or each open application. In some embodiments, identifying 502 the open applications and their instances includes receiving an indication from an operating system of active application and of open instance for each active application. The method 500 links 504 each open application to another open application and links each instance to another instance of the same application. In some embodiments, linking 504 the applications and instances includes creating a mapping structure that describes the links (e.g., relationships) between the various active applications and between the various instances of each application.

The method 500 detects 506 a switching command. In some embodiments, detecting 506 the switching command includes monitoring user input for the switching command. In further embodiments, detecting 506 the switching command includes monitoring touch input for an input gesture corresponding to the switching command. The method 500 determines 508 an axis and a direction of the switching command. In some embodiments, determining 508 the axis and a direction of the switching command axis determining whether the switching command is along a first axis or along a second axis perpendicular to the first axis.

The method 500 determines 510 a next application or a next instance based on the direction of the switching command and on the links between the applications and instances. In some embodiments, determining 510 the next application includes identifying an open application linked to the current application. In some embodiments, determining 510 the next instance includes identifying an instance of a current application linked to the current instance. In further embodiments, determining 510 the next application includes selecting a next application and/or next instance based on a mapping structure that describes the links (e.g., relationships) between the various active applications and between the various instances of each application.

If the switching command is along a first axis, the method 500 switches 512 to a next application. In certain embodiments, switching 512 to the next application includes identifying a next application based on a mapping structure organizing a plurality of active applications and open instances of each active application. In further embodiments, switching 512 to the next application includes identifying a top instance of the next application. In some embodiments, switching 512 to the next application includes accessing a pointer indicating a next instance based on the current instance.

Otherwise, if the switching command is on a second axis, the method switches 514 to a next instance of a current application, and the method 500 ends. The first and second axis are sufficiently distinct to easily associate a particular axis with the switching command. In some embodiments, the first axis and second axis are perpendicular to each other. In certain embodiments, switching 514 to the next instance includes identifying a next application based on a mapping structure organizing a plurality of active instances for each active application. In further embodiments, switching 514 to the next instance includes accessing a pointer indicating a next instance based on the current instance.

Figure 6:
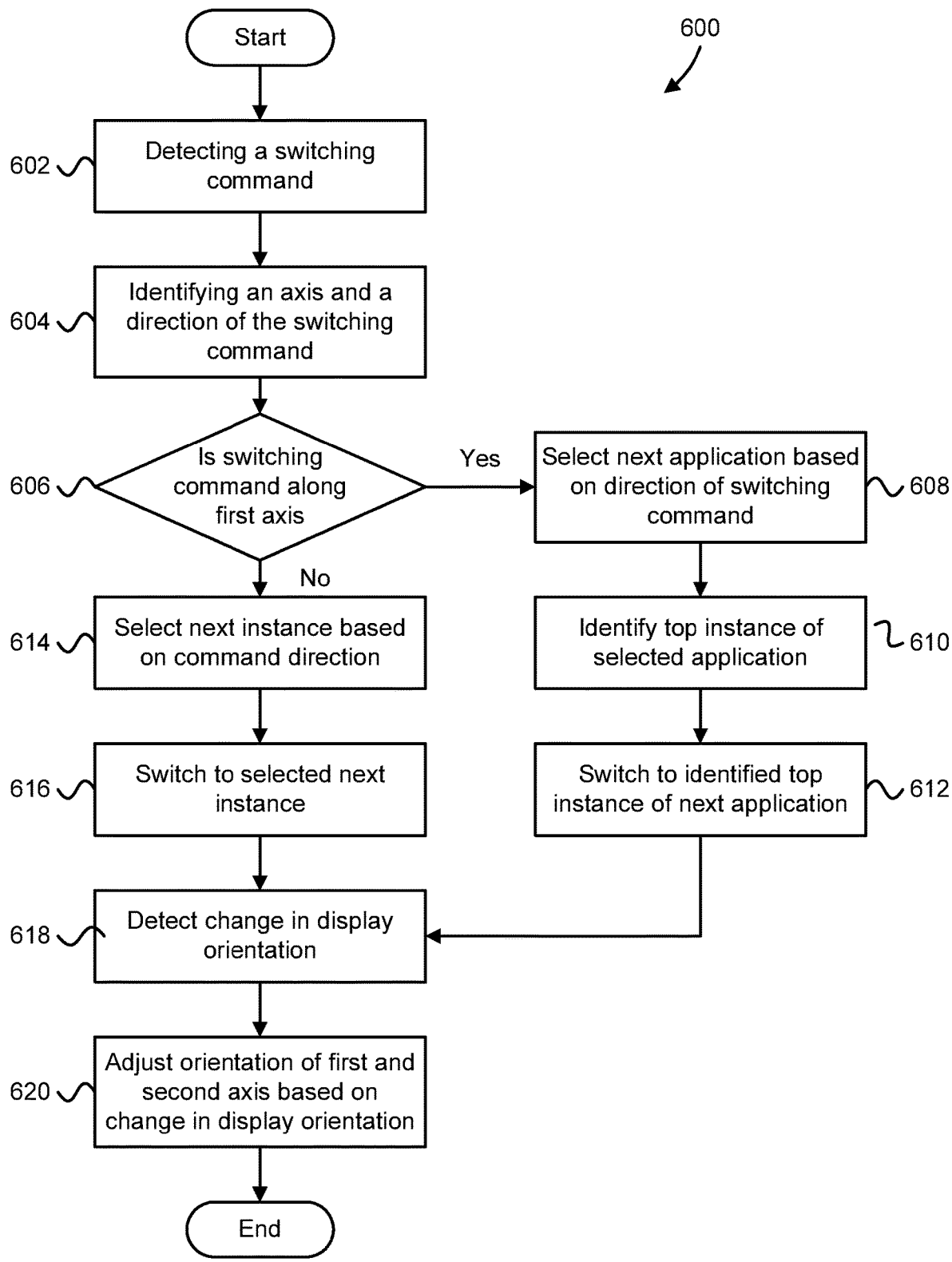
FIG. 6 is a schematic flow chart diagram illustrating another embodiment of a method for application switching.

FIG. 6 depicts a method 600 for application switching, according to embodiments of the disclosure. In some embodiments, the method 600 is performed by a mobile device, such as the electronic device 101 and/or the apparatus 200 described above with reference to FIGS. 1 and 2. In other embodiments, the method 600 may be performed by an illumination adjustment module, such as the application switching module 106 described above with reference to FIGS. 1 and 2. In certain embodiments, the method 600 may be performed by a processor executing program code, for example, a microcontroller, a microprocessor, a central processing unit (CPU), a graphics processing unit (GPU), an auxiliary processing unit, a field programmable gate array (FPGA), or the like.

The method 600 begins with detecting 602 a switching command. In some embodiments, detecting 602 the switching command includes monitoring user input for the switching command. In further embodiments, detecting 602 the switching command includes monitoring touch input for an input gesture corresponding to the switching command. The method 600 identifies 604 an axis and a direction of the switching command. The method 600 determines 606 whether the switching command is along a first axis.

In response to the switching command being along the first axis, the method 600 selects 608 a next application based on the direction of the switching command. Otherwise, the method 600 selects 614 a next instance based on the direction of the switching command in response to the switching command not being along the first axis (e.g., being along a second axis).

In some embodiments, the selecting 608 the next application includes identifying an open application linked to the current application. In further embodiments, selecting 608 the next application includes selecting a next application based on a mapping structure that describes the links (e.g., relationships) between the various active applications and between the various instances of each application. In some embodiments, selecting 608 to the next application includes accessing a pointer indicating a next application based on the current application.

The method 600 identifies 610 a top instance of the selected application. In some embodiments, identifying 610 the top instance includes referencing a pointer that indicates the last viewed instance of the selected application. The method 600 switches 612 to the next application.

In some embodiments, the selecting 614 the next instance includes identifying an instance of a current application linked to the current instance. In further embodiments, selecting 608 the next application includes selecting a next instance based on a mapping structure that describes the links (e.g., relationships) between the various active applications and between the various instances of each application. In some embodiments, selecting 614 the next instance includes accessing a pointer indicating a next instance based on the current instance.

The method switches 616 to the selected next instance. The method detects 618 a change in the display orientation. In some embodiments, detecting 618 the change in the display orientation includes receiving data from an accelerometer or gyroscope and determining whether the display orientation has changed based on the data. The method 600 adjusts 620 the orientations of the first axis and the second axis based on the change in the display orientation, and the method 600 ends. In certain embodiments, adjusting 620 the first and second axis includes rotating the first and second axis proportional to the change in display orientation. In further embodiments, adjusting 620 the first and second axis includes maintaining the orientation of the first and second axis with respect to the user despite the change in display orientation.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a display;
a processor; and
a memory that stores code executable by the processor to:
present on the display a user interface comprising a plurality of sliding windows, each window corresponding to an instance of an active application, wherein a plurality of applications are active on the apparatus, each active application comprising one or more instances, wherein at least one active application comprises a plurality of instances,
generate a mapping structure linking the plurality of active applications and corresponding instances and comprising a plurality of pointers, wherein the mapping structure comprises a first pointer comprising a top application pointer that points to a currently displayed active application and a plurality of second pointers comprising top instance pointers for each active application;
determine a most recently displayed instance of each of the plurality of active applications in the mapping structure;
determine the top instance pointer for each of the plurality of active applications in the mapping structure, the top instance pointer for the currently displayed active application pointing to a displayed instance of the currently displayed active application and the top pointer for an active application that is not currently displayed pointing to the determined most recently displayed instance of the active application that is not currently displayed,
wherein the plurality of active applications are arranged in a first dimension within the mapping structure and the plurality of instances are arranged in a second dimension within the mapping structure,
wherein the mapping structure links each active application to the top instance of a first active application in a first switching direction and to the top instance of a second active application in a second switching direction,
wherein the mapping structure includes a third pointer indicating a next instance in the first switching direction,
wherein the mapping structure includes a fourth pointer indicating a next instance in the second switching direction,
wherein the mapping structure links each instance of a particular active application to a first instance of the particular active application in a third switching direction and to a second instance of the particular active application in a fourth switching direction,
wherein the mapping structure includes a fifth pointer indicating a next instance in the third switching direction,
wherein the mapping structure includes a sixth pointer indicating a next application in the fourth switching direction;
identify a horizontal axis and a vertical axis with respect to the display based on an orientation of the apparatus, the vertical axis being perpendicular to the horizontal axis;
monitor user input for a switching command while presenting the current application, the user input comprising a multi-touch gesture input that includes a predetermined pattern of a plurality of touch inputs for the switching command;
determine whether the switching command is along the horizontal axis or along the vertical axis, the horizontal axis corresponding to the first dimension within the mapping structure and the vertical axis corresponding to the second dimension within the mapping structure;
identify a direction of the switching command along a determined axis, the direction being one of a first forward direction, a first backward direction, a second forward direction, and a second backward direction,
wherein the first forward direction and the first backward direction are opposite directions along the horizontal axis and the second forward direction and the second backward direction are opposite directions along the vertical axis;
present, on the display and without presenting a graphical gallery of active applications and/or instances of active applications during the switching command, an application window corresponding to:
an instance indicated by the third pointer in response to the switching command being in the first forward direction;
an instance indicated by the fourth pointer in response to the switching command being in the first backward direction wherein the first switching direction and second switching direction are opposite directions in the mapping structure;
an instance indicated by the fifth pointer in response to the switching command being in the second forward direction; and
an instance indicated by the sixth pointer in response to the switching command being in the second backward direction, wherein the third switching direction and fourth switching direction are opposite directions in the mapping structure; and
update the pointers of the mapping structure in response to the switching command.

2. The apparatus of claim 1, wherein the processor further detects changes to the orientation of the display and adjusts orientations of the first axis and the second axis in response to a change in orientation of the display.

3. The apparatus of claim 1, wherein the processor further inserts a newly opened application into the mapping structure and links the newly opened application to one or more active applications within the mapping structure.

4. The apparatus of claim 3, wherein the processor presents the newly opened application in the user interface as the current application and updates the pointers of the mapping structure in response to presenting the new application.

5. The apparatus of claim 1, wherein the processor identifies a plurality of open instances for an active application and links each open instance to one or more other open instances for the active application.

6. The apparatus of claim 1, wherein the display is a touchscreen that receives touch data corresponding to the user input, wherein the processor identifies a switching command based on the touch data.

7. The apparatus of claim 1, wherein the processor further:
detects whether a user closes an active application;
identifies one or more active applications linked to the closed application within the mapping structure;
removes links to the closed application;
links the identified one or more applications to other open applications responsive to the user closing the application; and updates the pointers of the mapping structure in response to the user closing the application.

8. The apparatus of claim 1, wherein the user input for a switching command comprises mouse input in conjunction with a key press.

9. A method comprising:
presenting, on an electronic device, a user interface comprising a plurality of sliding windows, each window corresponding to an instance of an open application, wherein a plurality of applications are open on the electronic device, each open application comprising one or more instances, wherein at least one open application comprises a plurality of instances;
generating a mapping structure linking the plurality of applications and corresponding instances and comprising a plurality of pointers, wherein the mapping structure comprises a first pointer comprising a top application pointer that points to a currently displayed active application and a plurality of second pointers comprising top instance pointers for each active application;
determining a most recently displayed instance of each of the plurality of active applications in the mapping structure;
determining the top instance pointer for each of the plurality of active applications in the mapping structure, the top instance pointer for the currently displayed active application pointing to a currently displayed instance of the currently displayed active application and the top pointer for an active application that is not currently displayed pointing to the determined most recently displayed instance of the active application that is not currently displayed,
wherein the plurality of open applications are arranged in a first dimension within the mapping structure and the plurality of instances are arranged in a second dimension within the mapping structure,
wherein the mapping structure links each open application to the top instance of a first open application in a first switching direction and to the top instance of a second open application in a second switching direction,
wherein the mapping structure includes a third pointer indicating a next instance in the first switching direction,
wherein the mapping structure includes a fourth pointer indicating a next instance in the second switching direction,
wherein the mapping structure links each instance of a particular open application to a first instance of the particular open application in a third switching direction and to a second instance of the particular open application in a fourth switching direction,
wherein the mapping structure includes a fifth pointer indicating a next instance in the third switching direction,
wherein the mapping structure includes a sixth pointer indicating a next application in the fourth switching direction;
identifying a horizontal axis and a vertical axis with respect to the electronic device based on an orientation of the electronic device, the vertical axis being perpendicular to the horizontal axis;
detecting, by use of a processor, a switching command while presenting the current application, the switching command comprising a multi-touch gesture input that includes a predetermined pattern of a plurality of touch inputs;
determining whether the switching command is along the horizontal axis or along the vertical axis, the horizontal axis associated with the first dimension within the mapping structure and the vertical axis associated with the second dimension within the mapping structure;
identifying a direction of the switching command along a determined axis, the direction being one of a first forward direction, a first backward direction, a second forward direction, and a second backward direction, wherein the first forward direction and the first backward direction are opposite directions along the horizontal axis and the second forward direction and the second backward direction are opposite directions along the vertical axis;
switching, without presenting a graphical gallery of active applications and/or instances of active applications during the switching command, an application window corresponding to:
an instance indicated by the third pointer in response to the switching command being in the first forward direction,
an instance indicated by the fourth pointer in response to the switching command being in the first backward direction, wherein the first switching direction and second switching direction are opposite directions in the mapping structure;
an instance indicated by the fifth pointer in response to the switching command being in the second forward direction, wherein the next instance replaces the current instance as the top instance for the current application in response to the switching command being in the second forward direction; and
an instance indicated by the sixth pointer in response to the switching command being in the second backward direction, wherein the next instance replaces the current instance as the top instance for the current application in response to the switching command being in the second backward direction, wherein the third switching direction and fourth switching direction are opposite directions in the mapping structure; and
updating the pointers of the mapping structure in response to the switching command.

10. The method of claim 9, further comprising:
detecting a change to the orientation of the display; and
adjusting orientations of the horizontal axis and the vertical axis in response to detecting the change in the orientation of the display.

11. The method of claim 9, further comprising:
detecting whether a user opens a new application; and
linking the new application to one or more other open applications within the mapping structure responsive to the user opening the new application.

12. The method of claim 11, further comprising:
presenting the new application in the user interface as the current application in response to the user opening the new application; and
updating the pointers of the mapping structure in response to presenting the new application.

13. The method of claim 9, further comprising:
detecting whether a user closes an application;
identifying one or more applications linked to the closed application within the mapping structure;
removing links to the closed application;
linking the identified one or more applications to other open applications responsive to the user closing the application; and updating the pointers of the mapping structure in response to the user closing the application.

14. The method of claim 9, wherein the switching command comprises mouse input in conjunction with a key press.

15. A program product comprising a computer readable storage medium that is not a transitory signal and that stores code executable by a processor, the executable code comprising code to perform:
- presenting, on an electronic device, a user interface comprising a plurality of sliding windows, each window corresponding to an instance of an open application, wherein a plurality of applications are active on the electronic device, each active application comprising one or more instances, wherein at least one active application comprises a plurality of instances;
- generating a mapping structure linking the plurality of active applications and corresponding instances and comprising a plurality of pointers, wherein the mapping structure comprises a first pointer comprising a top application pointer that points to a currently displayed active application and a plurality of second pointers comprising top instance pointers for each active application;
- determining a most recently displayed instance of each of the plurality of active applications in the mapping structure;
- determining the top instance pointer for each of the plurality of active applications in the mapping structure, the top instance pointer for the currently displayed active application pointing to a currently displayed instance of the currently displayed active application and the top pointer for an active application that is not currently displayed pointing to the determined most recently displayed instance of the active application that is not currently displayed,
- wherein the plurality of active applications are arranged in a first dimension and the plurality of instances are arranged in a second dimension,
- wherein the mapping structure links each active application to the top instance of a first active application in a first switching direction and to the top instance of a second active application in a second switching direction,
  - wherein the mapping structure includes a third pointer indicating a next instance in the first switching direction,
  - wherein the mapping structure includes a fourth pointer indicating a next instance in the second switching direction,
- wherein the mapping structure links each instance of a particular active application to a first instance of the particular active application in a third switching direction and to a second instance of the particular active application in a fourth switching direction,
  - wherein the mapping structure includes a fifth pointer indicating a next instance in the third switching direction,
  - wherein the mapping structure includes a sixth pointer indicating a next application in the fourth switching direction;
- identifying a vertical axis with respect to the display;
- identifying a horizontal axis with respect to the display, the horizontal axis being perpendicular to the vertical axis;
- monitoring user input for a switching instruction while presenting the current application, the switching instruction comprising a multi-touch gesture input that includes a predetermined pattern of a plurality of touch inputs;
- identifying an axis associated with the switching instruction based on an orientation of the electronic device, the axis being one of: the vertical axis corresponding to the first dimension within the mapping structure and the horizontal axis corresponding to the second dimension within the mapping structure;
- determining a direction of the switching command along an identified axis, the direction being one of a first forward direction, a first backward direction, a second forward direction, and a second backward direction, wherein the first forward direction and the first backward direction are opposite directions along the vertical axis and the second forward direction and the second backward direction are opposite directions along the horizontal axis, the second axis being at a right angle to the vertical axis;
- displaying, without presenting a graphical gallery of active applications and/or instances of active applications during the switching instruction, an application window corresponding to:
  - an instance indicated by the third pointer in response to the switching instruction being in the first forward direction,
  - an instance indicated by the fourth pointer in response to the switching instruction being in the first backward direction;
  - an instance indicated by the fifth pointer in response to the switching instruction being in the second forward direction, wherein the mapping structure is updated to point to the next instance as the top instance for the current application in response to the switching instruction; and
  - an instance indicated by the sixth pointer in response to the switching instruction being in the second backward direction, wherein the mapping structure is updated to point to the next instance as the top instance for the current application in response to the switching instruction; and
- updating the pointers of the mapping structure in response to the switching instruction.

16. The program product of claim 15, the executable code further comprising code to perform:
- detecting whether a user opens a new application; and
- linking the new application to one or more other open applications within the mapping structure responsive to the user opening the new application.

17. The program product of claim 15, the executable code further comprising code to perform:
- detecting whether a user closes an application;
- identifying one or more applications linked to the closed application within the mapping structure;
- removing links to the closed application;
- linking the identified one or more applications to other open applications responsive to the user closing the application; and
- updating the pointers of the mapping structure in response to the user closing the application.

18. The program product of claim 15, the executable code further comprising code to perform:
- presenting the new application in the user interface as the current application in response to the user opening the new application; and
- updating the pointers of the mapping structure in response to presenting the new application.

19. The program product of claim 15, the executable code further comprising code to perform:

detecting a change to the orientation of the display; and
 adjusting orientations of the horizontal axis and the vertical axis in response to detecting the change in the orientation of the display.

20. The program product of claim 15, wherein the user input for a switching instruction comprises mouse input in conjunction with a key press.

* * * * *